United States Patent [19]

Sasena

[11] 3,985,343
[45] Oct. 12, 1976

[54] METHOD FOR FENCE CONSTRUCTION

[75] Inventor: John J. Sasena, Parma, Ohio

[73] Assignee: Eaton Corporation, Cleveland, Ohio

[22] Filed: May 27, 1975

[21] Appl. No.: 580,637

Related U.S. Application Data

[62] Division of Ser. No. 536,146, Dec. 24, 1974.

[52] U.S. Cl. .................................. 256/47; 256/32
[51] Int. Cl.² ...................................... B21F 27/00
[58] Field of Search ............... 256/1, 47, 65, 32, 35, 256/54; 24/73 P, 73 PF, 73 SM, 243 K; 248/62

[56] References Cited
UNITED STATES PATENTS

| | | | |
|---|---|---|---|
| 1,236,150 | 8/1917 | Daniels | 256/54 |
| 1,360,375 | 11/1920 | Dammiann | 256/54 |
| 1,925,488 | 9/1933 | Kern | 256/54 |

Primary Examiner—Robert L. Wolfe
Assistant Examiner—Doris L. Troutman
Attorney, Agent, or Firm—Teagno & Toddy

[57] ABSTRACT

A one-piece spring fastener is provided for mounting fencing wire or the like to a channel shaped support. In one embodiment the wire is mounted generally perpendicularly to the support and is free to move along its axis relative to the support. The fastener is of a generally U shape in cross-section comprising two generally parallel, spaced apart, generally T shaped members joined along substantially the entire tops thereof by a bight or interconnecting bridge portion. The top portions of the T shaped members in combination with the bight portion form a trough for receipt of the wire and the base portions of the T shaped members are generally dart shaped for non-rotational, forced receipt inbetween and retention by the inturned flanges of the channel shaped support. Projections on opposite ends of the top portions are designed to engage opposite, parallel, exterior surfaces of the support when the dart shaped base portions are retainingly engaged between the inturned flanges to prevent rotation of the fastener relative to the support.

3 Claims, 7 Drawing Figures

METHOD FOR FENCE CONSTRUCTION

This is a division of application Ser. No. 536,146, filed Dec. 24, 1974.

BACKGROUND OF THE INVENTION

1. Field of the Invention

This invention relates to fasteners for attaching wires to supports and more particularly relates to one-piece, spring fasteners for mounting fencing wires to generally channel shaped fence supports.

2. Description of the Prior Art

The prior art includes several fasteners for mounting an elongated member such as a conduit, a pipe, a wire or the like, to a generally channel shaped support. Examples of such prior art devices may be seen by reference to U.S. Pat. Nos. 3,532,311; 2,863,625 and 1,360,375.

The prior art devices were not completely satisfactory, especially when utilized for mounting fencing wire to fencing supports, as the devices allowed considerable rotation of the wire relative to the support, prevented axial movement of the wire relative to the support, required a rotational installation procedure and/or were not designed to be relatively permanently mounted to the support member.

SUMMARY OF THE INVENTION

In accordance with the present invention, the drawbacks of the prior art have been overcome to the extent that a one-piece, spring fastener is provided for nonrotational, forced insertion in between and permanent retention by the inturned flanges of a channel shaped support and for mounting a wire generally perpendicularly to the support member for movement of the wire along its axis relative to the support member. The fastener is provided with means to prevent its rotation relative to the support and includes a wire receiving trough extending substantially the width of the support to maintain the axis of the wire generally perpendicular to the axis of the support.

The above is accomplished by providing a cross-sectionally generally U-shaped fastener comprising two substantially flat, generally parallel, generally T-shaped members joined along substantially the entire tops thereof by a bight portion. The top portions of the T-shaped members extend substantially the width of the support and in combination with the bight portion form a trough for receipt of the wire. The bases of the T-shaped members are of a dart shape for non-rotational, forced receipt and retention between the inturned flanges of the support. The ends of the top portions are provided with projections which will engage and/or penetrate the opposite, exterior, parallel surfaces of the support when the dart shaped bases are received between the inturned flanges to prevent rotation of the fastener relative to the support. The trough is of larger cross-sectional dimensions than the maximum diameter of wire to be received to allow the wire to move along its axis to compensate along its entire length for contractions and expansions due to temperature variations, local displacements and the like.

Accordingly, it is an object of the present invention to provide a new and improved fastener for mounting elongated members, such as a fencing wire, to a channel shaped support.

Another object of the present invention is to provide a new and improved fencing system utilizing a plurality of novel, one-piece spring fasteners, a plurality of channel shaped supports and fencing wire.

A further object is to provide a new and improved, one-piece, spring fastener for mounting a wire perpendicular to and for movement along its axis relative to a channel shaped support.

These and other objects and advantages of the present invention will become apparent from a reading of the detailed description of the preferred embodiment taken in connection with the drawings.

DESCRIPTION OF THE PREFERRED EMBODIMENT

Figure 1:
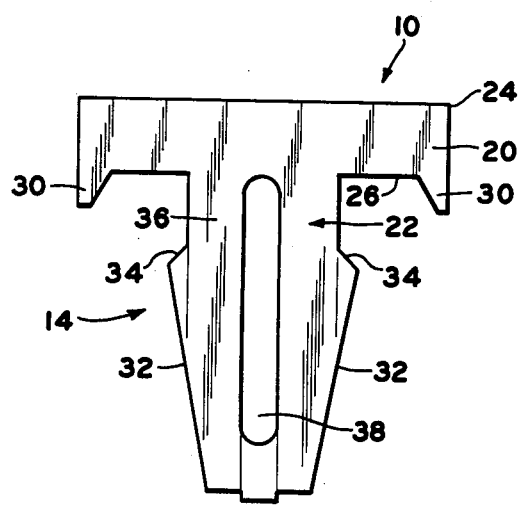
FIG. 1 is a front elevational view of the fastener of the present invention.
Figure 3:
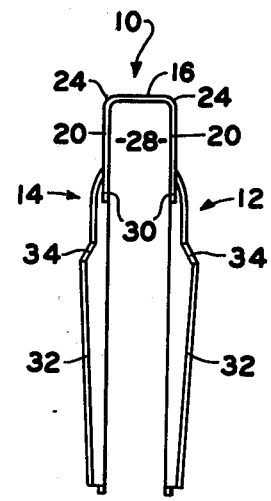
FIG. 3 is a bottom view of the fastener of the present invention.
Figure 2:
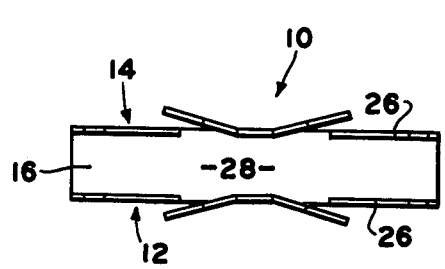
FIG. 2 is a side view of the fastener of the present invention.

The fastener 10 of the present invention is illustrated in FIGS. 1–3. The channel shaped support, or fence post, 60 utilized in connection with the present invention may be seen by reference to FIG. 4. The fastener 10 as utilized to mount a wire, W, to the support 60 and the fence system utilizing fastener 10, support 60 and wire W may be seen by reference to FIGS. 5 and 6. FIG. 7 schematically illustrates the fastener 10 being permanently installed into a channel shaped support 60 for mounting a wire, W, thereto.

The fastener 10 is a one-piece spring fastener, preferably a spring steel stamping. The fastener 10 may also be a molded fastener or the like. The fastener 10 is of a generally U-shaped cross-section, see FIG. 3, comprised of two substantially flat, generally T-shaped members 12 and 14 joined by a bight or interconnecting bridge portion 16. The T-shaped members 12 and 14, are generally parallel and the bight portion 16 extends generally perpendicularly therebetween.

The T-shaped members, 12 and 14, are substantially identical, consisting of substantially identical portions, and thus only member 12 will be described and illustrated in detail. T-shaped member 12 consists of a top portion 20 and a base portion 22. The top portion is defined by top edge 24 and a bottom, parallel edge 26. The bight portion 16 extends from the top edge 24 of T-shaped member 12 to the top edge 24 of T-shaped member 14. The top portion 20, in combination with the bight portion 16, defines a trough 28 for receipt of the wire W. The top edges 24 of each T-shaped member are separated from the bottom edges 26, and the top edge 24 of the member 12 is separated from the top edge 24 of member 14, by a distance greater than the maximum diameter of the wire W to be received. This dimensional relationship allows for movement of the wire W along its axis relative to the support member 60 when fastener 10 is utilized to mount wire W to support 60 as will be discussed in greater detail below. Movement of wire W along its axis is important to allow wire W to contract and expand compensating for variations in temperature and the like.

The top portion 20 extends for a length substantially equal to or greater than the width of support member 60 and thus the trough 28 defined by the top portions 20 and the bight portion 16 is of a considerable extension to maintain the mounted wire W substantially perpendicular to the axis of the support 60. Extending downwardly from opposite ends of the bottom edges 26 are projections 30 designed to engage and/or penetrate the opposite parallel exterior sides of the support 60 to prevent rotation of fastener 10 relative to the support as will be discussed in greater detail below.

The bases 22 of the T-shaped members, 12 and 14, extend downwardly from the midpoints of the bottom edges 26. The bases 22 are of generally dart shape comprising a pair of outwardly and upwardly extending surfaces 32 terminating at shoulders 34. A relatively straight shaft 36 extends from the shoulders 34 to the bottom edge 26. The base may include one or more cut-out portions, or slots, 38, which will allow for resilient, inward deflection of surfaces 32 and/or shaft 36 as is well known in the art. The dart shaped bases 22 are designed for non-rotational, forceful, insertion inbetween and permanent retention by the inturned flanges of the channel shaped support as will be discussed in greater detail in connection with FIGS. 5, 6 and 7.

Figure 4:
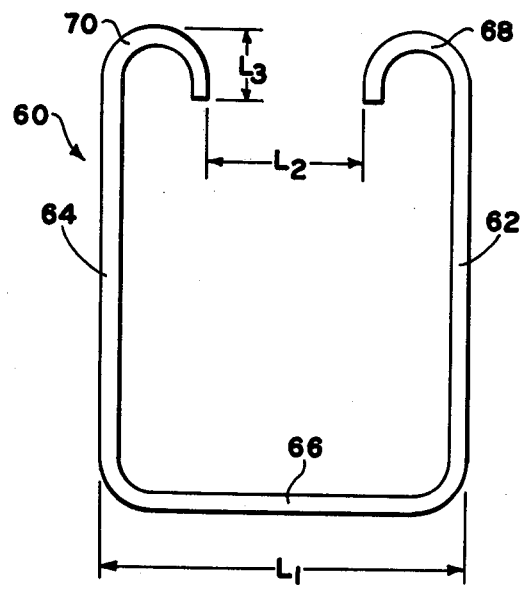
FIG. 4 is a top view of a channel shaped support.

The channel shaped support 60 is illustrated in top view in FIG. 4. The support is a one-piece structure which may be extruded or rolled in endless lengths and then cut to desired size. The support comprises a pair of parallel sides, 62 and 64, a rear 66 which is generally perpendicular to the sides 62 and 64, and a pair of inturned flanges 68 and 70 extending from the front edges of sides 62 and 64. The rear 66 is of a substantially constant width, L1, and the inturned flanges, 68 and 70, are separated by a substantially constant distance, measured parallel to the rear 66, L2. Each inturned flange, 68 and 70, extends rearwardly a distance L3.

Figure 5:
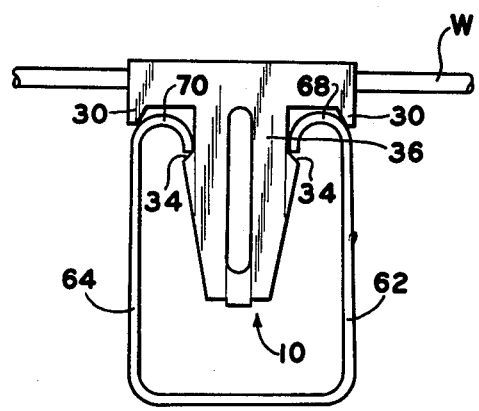
FIG. 5 is a top view of the fastener of the present invention mounting a wire to a channel shaped support.

FIG. 5 illustrates the fastener 10 as permanently installed in a channel shaped support 60 and as mounting a wire, W, generally perpendicularly to the axis of the support. As may be seen, the shaft portion 36 is of a width substantially equal to separation, L2, between the inturned flanges 68 and 70. The shoulders 34 are spaced from the bottom edges 26 by a distance substantially equal to the rearward extension, L3, of the inturned flanges for relatively permanent retention thereby. The shoulders 34 may be slightly inwardly and upwardly inclined to allow for variable rearward extensions L3 of the inturned flanges as is well known in the art. The top portion 20 extends substantially the width, L1, of the support and in this portion, projections 30 engage and/or penetrate the exterior parallel surfaces of sides 62 and 64 to prevent rotation of the fastener relative to the support. Projections 30 may be of a barb or wedge configuration to tightly engage and/or penetrate the sides 62 and 64 of the support upon receipt and retention of dart shaped base 22 inbetween the inturned flanges 68 and 70.

Figure 6:
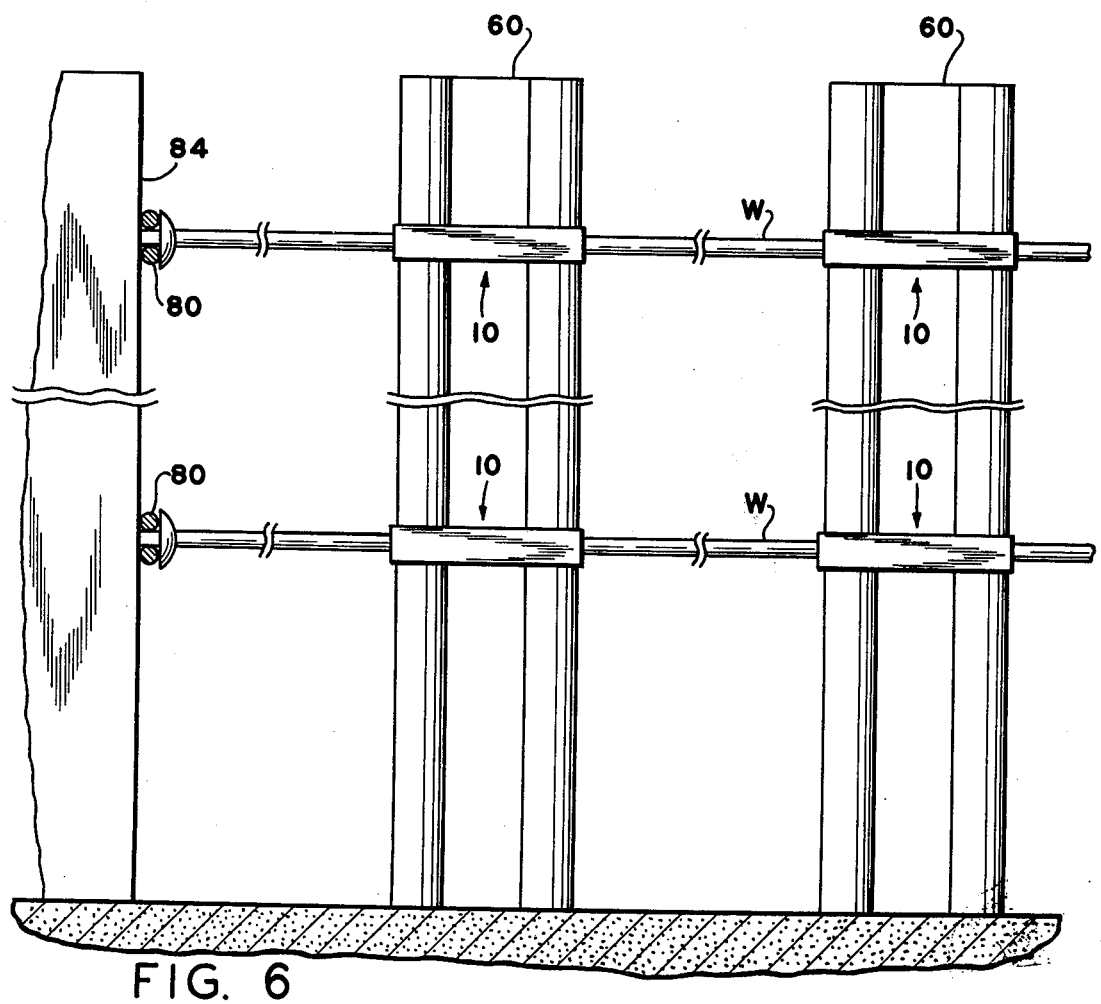
FIG. 6 is a sectional view of a fencing system utilizing the fastener of the present invention.
Figure 7:
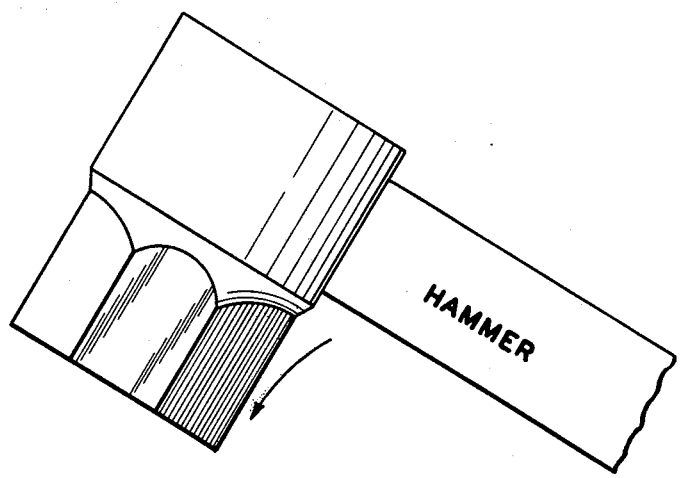
FIG. 7 is a schematic view of the fastener of the present invention being permanently installed into a channel shaped support for mounting a wire to the support.
Figure 7:
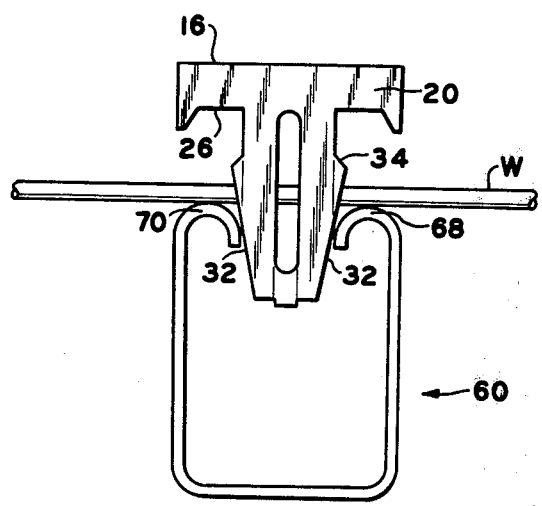

In FIG. 6, a fencing system utilizing a plurality of channel shaped supports 60, a plurality of fasteners 10 and a wire W is illustrated. The assembly of such a system is illustrated in FIG. 7. In FIG. 7, a wire, W, is laid across the front of a support 60 which has been driven into the ground. A fastener 10 is then placed with the leading edges of tapered surfaces 32 of the bases 22 at the opening between the inturned flanges and with the wire, W, inbetween the two T-shaped members 12 and 14. A sharp hammer blow to the bight portion 16 will cause the tapered surfaces to resiliently deform inwardly as the top portion 20 is driven towards the support. At such time as the bottom edge 26 of the top portion 20 contacts the forward ends of the flanges, 68 and 70, the tapered surfaces will at least partially clear the flanges and resiliently return to an undeformed position and shoulders 34 will engage the inward ends of the flanges permanently installing the fastener 10 to the support 60 (see FIG. 5). The terms "permanently retaining" and "permanently installing" as used herein mean retained in a manner which will not, under ordinary circumstances, allow non-destructive removal.

As may be seen in FIG. 6, the ends, 80, of the wire W are rigidly fixed, at a desired tension, to end supports, such as 84. The end supports may, of course, be one or more of the channel shaped supports 60. In the case of a continuous, closed fence, both ends of the wire may be rigidly fixed to the same end support.

Although this invention has been described in its preferred form with a certain degree of particularity, it is understood that the present disclosure of the preferred form has been made by way of example only and that numerous changes in the details of construction and arrangement of parts may be resorted to without departing from the spirit and the scope of the invention as hereinafter claimed.

I claim:

1. A fence construction system comprising:
   at least one strand of fencing wire, said strand of fencing wire being of a predetermined maximum diameter and of a length sufficient to extend the length of the fence;
   a plurality of cross-sectionally channel shaped fence posts, each of said posts comprising a pair of generally parallel side walls, a rear wall extending perpendicularly between said side walls and a pair of inturned flanges extending from the front edges of said side walls;
   means to rigidly fixed the ends of the strand to a fixed end support; and
   a plurality of fasteners for mounting the strand of wire generally perpendicularly to the axis of the posts to be interposed the rigidly fixed ends of the strand, said fasteners mounting the strand for movement along the axis of the strand relative to the post, said fasteners comprising a one-piece, generally cross-sectionally U-shaped body having a pair of substantially flat, generally parallel, generally T-shaped members joined along substantially the entire top portions thereof by a bight portion extending generally perpendicularly therebetween, said T-shaped members comprising a top portion and a base portion, said top portions in combination with the bight portion forming a trough for receipt of the strand and said base portions being of dart shape for forceful receipt inbetween and permanent retention by the inturned flanges of said posts.

2. The fence construction system of claim 1 wherein said top portions of said fasteners comprise a top edge from which said bight portion extends and a substantially parallel bottom edge from which said base portion extends, said top edges separated and the top and bottom edges of each member separated by a distance greater than said predetermined diameter, said top portions being of a length substantially equal to the separation between the side walls of the post and having projections extending downwardly from the ends of the bottom edges.

3. The fence construction system of claim 2 wherein said projections are generally wedge shaped and are adapted to engage the side walls of the posts when the dart shaped base portions are received inbetween and retained by the inturned flanges of the posts.

\* \* \* \* \*